United States Patent [19]
Gentner

[11] Patent Number: 6,027,005
[45] Date of Patent: Feb. 22, 2000

[54] METHOD AND APPARATUS FOR AUTOMATICALLY WELDING FRAMES

[76] Inventor: David G. Gentner, 2277 Tomahawk Dr., Lapeer, Mich. 48446

[21] Appl. No.: 09/026,392

[22] Filed: Feb. 19, 1998

Related U.S. Application Data

[60] Provisional application No. 60/038,875, Feb. 12, 1997.
[51] Int. Cl.[7] ............................................. B23K 37/04
[52] U.S. Cl. ....................................... 228/6.1; 228/10
[58] Field of Search ............................. 228/4.1, 6.1, 7, 228/10, 47.1, 56.5; 198/345.1, 836.1, 836.2, 836.3

[56] References Cited

U.S. PATENT DOCUMENTS

| | | | |
|---|---|---|---|
| 3,744,032 | 7/1973 | Engelberger et al. | 364/474.01 |
| 3,747,184 | 7/1973 | Zaiss et al. | 228/4.1 |
| 4,447,697 | 5/1984 | Dunne et al. | 219/86.41 |
| 5,111,988 | 5/1992 | Strickland | 228/102 |
| 5,123,587 | 6/1992 | Ashmore | 228/170 |
| 5,532,450 | 7/1996 | Iwai et al. | 219/121.63 |

*Primary Examiner*—Samuel M. Heinrich
*Attorney, Agent, or Firm*—Weintraub & Brady, P.C.

[57] ABSTRACT

A method and apparatus for welding steel frames, which can be subsequently assembled together to form storage racks for holding and supporting inventory stored on pallets, in boxes, or in other bulk form in warehouses. A method according to the present invention, generally, includes the steps of placing a plurality of overlapping frame members in spaced relation to one another on a jig which holds the frame members in place thereon; moving the jig along a conveyor to a welding station which comprises a trigger switch and a welding tip, the trigger switch being operable to switch the welding tip on when the trigger switch is activated; and moving a first interconnecting frame member past the trigger switch, thereby switching the welding tip on to perform a welding operation connecting at least two of the frame members together, and moving the first interconnecting frame member beyond the trigger switch, thereby switching off the welding tip. An apparatus for welding steel frames, generally, includes a support structure for movably supporting a plurality of frame components as they are guided therethrough by a conveyor. The apparatus also includes a conveyor which is movably attached to the support structure, for holding a plurality of frame components in spaced relation to one another and for guiding the frame components through the support structure in a frame welding operation. A drive mechanism is provided for moving the conveyor with respect to the support structure, and at least one welding station is attached to the support structure, the welding station including a welding tip for welding frame components together, and a trigger switch for switching the welding tip on and off.

6 Claims, 8 Drawing Sheets

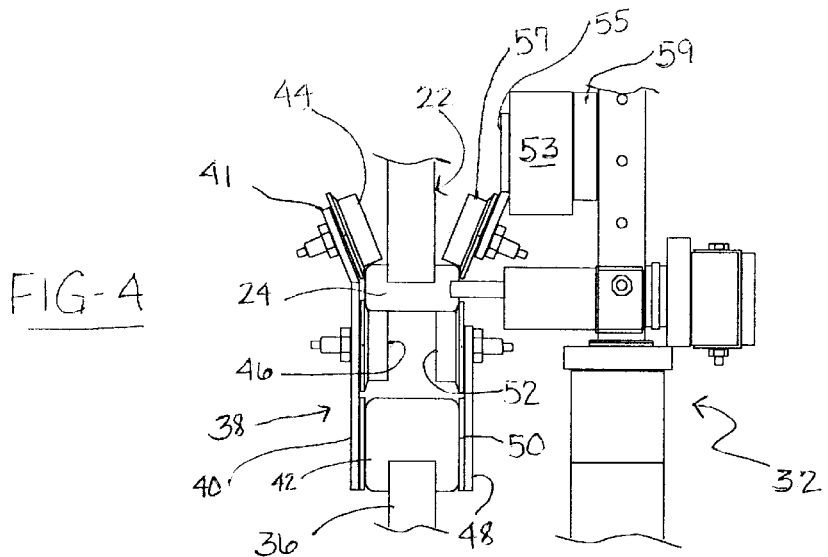
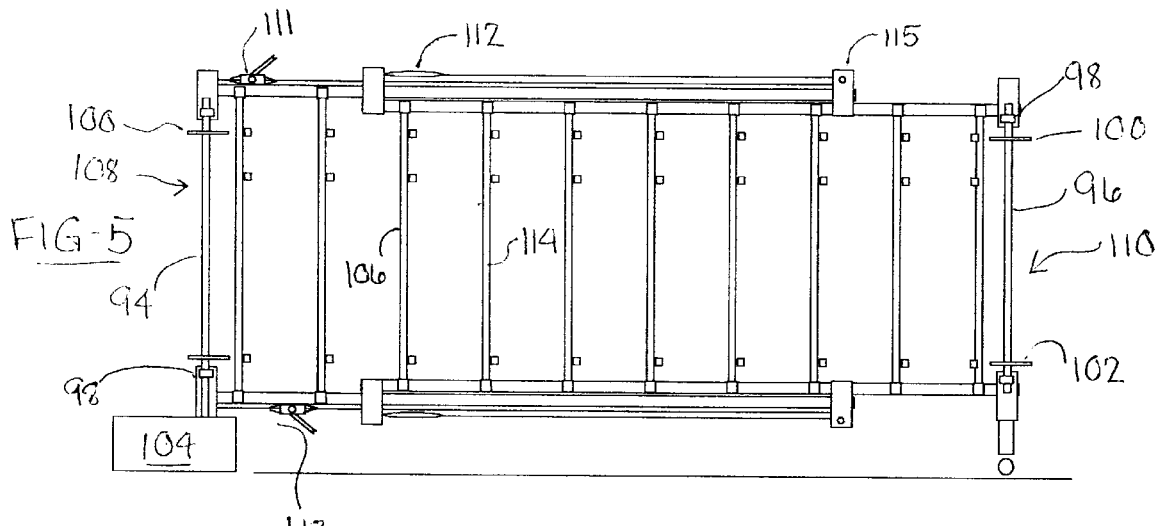
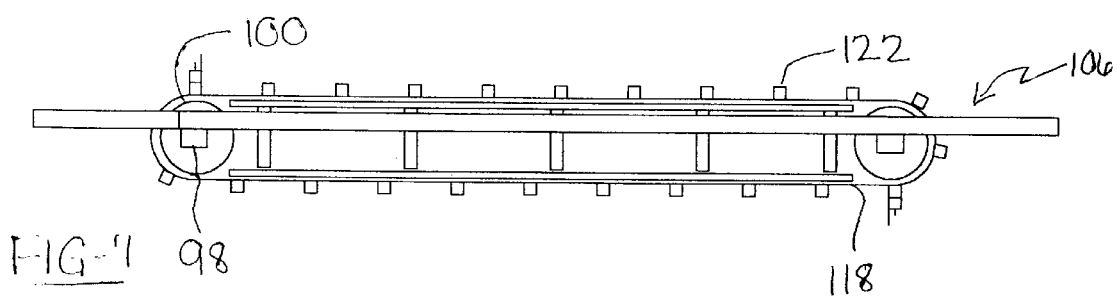

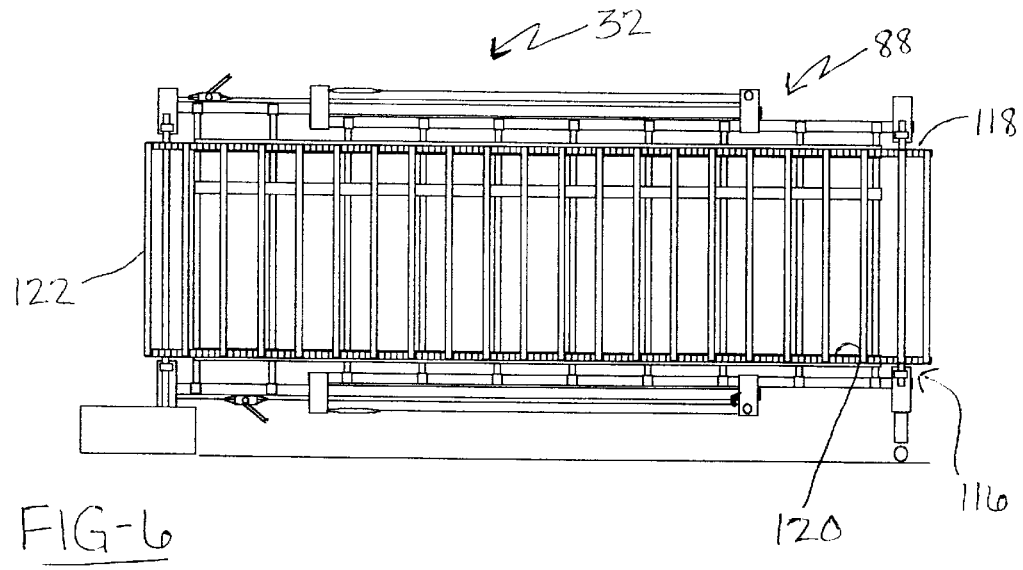
FIG-6
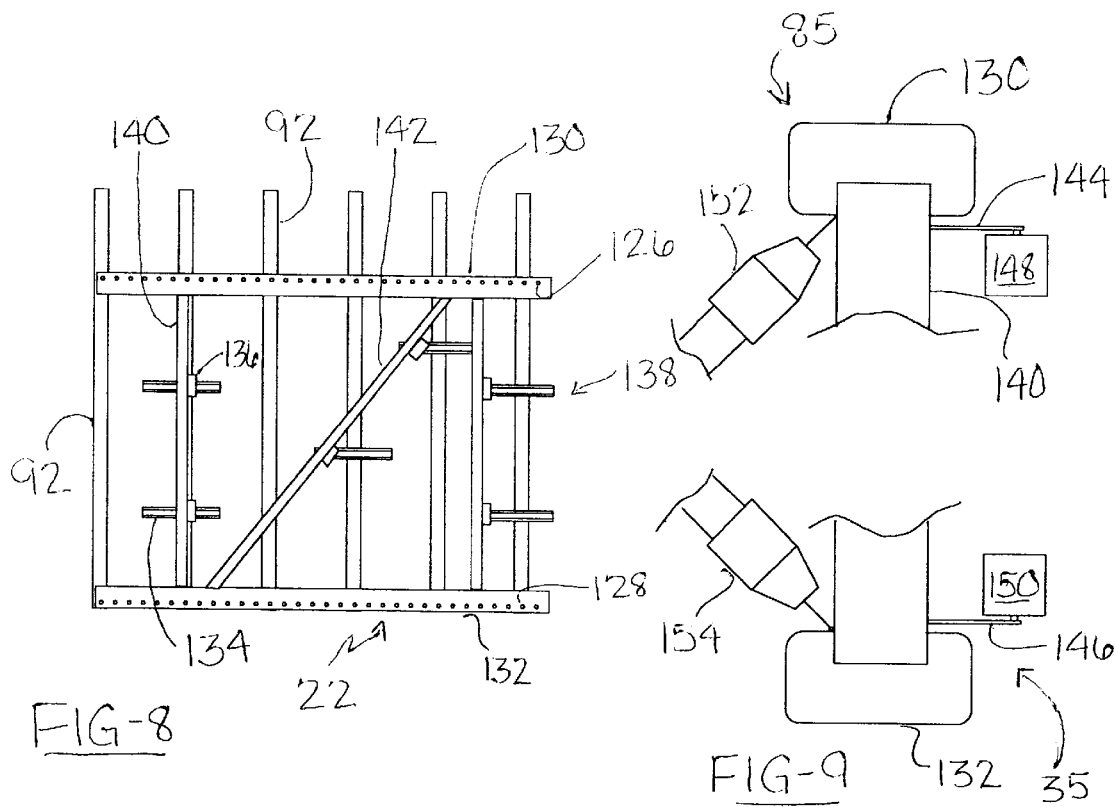
FIG-8
FIG-9

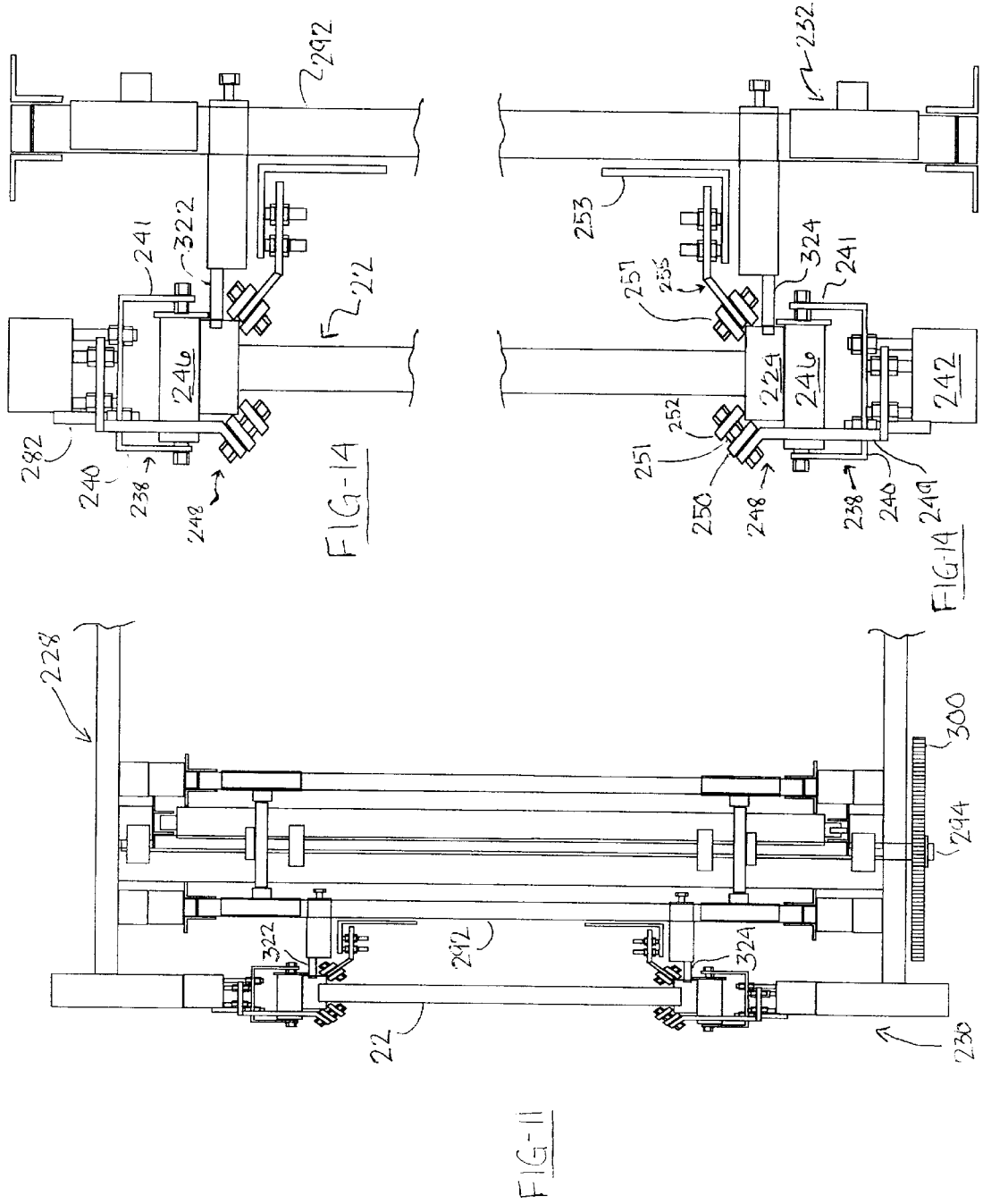

METHOD AND APPARATUS FOR AUTOMATICALLY WELDING FRAMES

This application claims benefit of provisional Appl. Ser. No. 60/038,875 filed Feb. 12, 1997.

BACKGROUND OF THE INVENTION

1. Field of the Invention

The present invention relates to a method and apparatus for automatically welding metal frames, such as frames used in the construction of storage racks. More particularly, the present invention relates to a method and apparatus for holding frame components in a proper configuration thereof, moving the frame components past automated welders, and welding the components together to create a frame.

2. Description of the Background Art

Supportive frames, such as those manufactured by the method and apparatus according to the present invention, are known and used in industry to assemble into storage racks for storing inventory in warehouses. The preferred material, for forming frames of this type, is steel because of its strength and availability. These frames are used in multiple applications as reinforcing structural members. Among other uses, the frames form component parts of storage racks, and are assembled together to create multi-level storage rack assemblies for storing inventory in boxes, pallets, or other form thereof in industrial warehouses.

As shown in FIGS. 1 and 1A, an exemplary complete frame 10 generally includes an upper frame member 12 which is perforated with holes 15 formed therethrough along the length thereof, as shown. It should be noted that the holes 15 may be absent or present and of any desired geometric configuration, i.e., rectangular, oblong, ovate, elliptical, circular, etc.

The upper frame member 12 is U-shaped in cross-section, and is oriented with the opening 14 of the 'U' facing downwardly. The frame 10 also includes a lower frame member 16 which is substantially identical to the upper frame member 12, but which is oriented with its opening 18 facing upwardly, as shown. A number of vertical cross members 20 interconnect the upper and lower frame members 12, 16 by fitting into the openings 14, 18 thereof, and are attached thereto by welding. In addition, a slanted cross member 21 is disposed between each pair of vertical cross members for reinforcement and added strength, and is oriented at approximately a 45 degree angle to the vertical cross members 20, as shown. Upper and lower ends of each slanted cross member 21 are also welded to the upper and lower frame members 12, 14 respectively.

However, the known manual method of hand building and welding these frames 10, which is the method used today, is relatively slow and is prone to human error, if an assembler does not line up the pieces right or weld the pieces together properly. This slow manual assembly results in relatively high labor costs for the hand-built frames, and this cost must be reflected in the price charged for the finished frames.

What is needed is a quicker and more reliable method of assembling the frames 10.

SUMMARY OF THE INVENTION

The present invention provides a method and apparatus for welding steel frames, which can be subsequently assembled together to form storage racks for holding and supporting inventory stored on pallets, in boxes, or in other bulk form in warehouses.

A method according to the present invention, generally, comprises:
  a) placing an upper frame member, a lower frame member and a plurality of interconnecting frame members in spaced relation to one another on a jig which holds the frame members in place thereon;
  b) moving the jig along a conveyor to a welding station which comprises a trigger switch and a welding tip, the trigger switch being operable to switch the welding tip on when the trigger switch is activated; and
  c) moving a first interconnecting frame member past the trigger switch, thereby switching on the welding tip to perform a welding operation connecting at least two of the frame members together.

As noted above, the present invention also includes an apparatus for welding steel frames. An apparatus according to the present invention, generally, includes:
  a support structure for movably supporting a plurality of frame components as they are guided therethrough by a conveyor;
  a conveyor which is movably attached to the support structure, for holding a plurality of frame components in spaced relation to one another and for guiding the frame components through the support structure in a frame welding operation;
  means for moving the conveyor with respect to the support structure; and
  at least one welding station attached to the support structure, the welding station comprising
a welding tip for welding frame components together, and a trigger switch for switching the welding tip on. Accordingly, it is an object of the present invention to provide a method and apparatus for automatically, or semi-automatically, assembling frames.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 4 is an expanded detail view of a portion of FIG. 3;

FIG. 5 is a side plan view of a supportive framework and drive mechanism for a conveyor for moving a latent frame assembly through the support structure of FIG. 2, with a drive chain assembly removed for purposes of illustration;

FIG. 6 is a side plan view of the conveyor of FIG. 5, showing the drive chain assembly in place;

FIG. 7 is a top plan view of the conveyor of FIG. 6;

FIG. 8 is a side plan view of a latent frame assembly mounted on the conveyor of FIGS. 6–7;

FIG. 9 is a vertical cross-sectional view, partially cut away, of a latent frame assembly passing through upper and lower areas of a welding station of the apparatus hereof;

FIG. 11 is a partial cross-sectional view of an automated frame welding apparatus in accordance with the second embodiment of the present invention;

FIG. 13 is an enlarged detail view of a portion of FIG. 12;

FIG. 14 is an enlarged detail view of a portion of FIG. 11;

DETAILED DESCRIPTION OF THE PREFERRED EMBODIMENT

OVERVIEW

Figure 2:
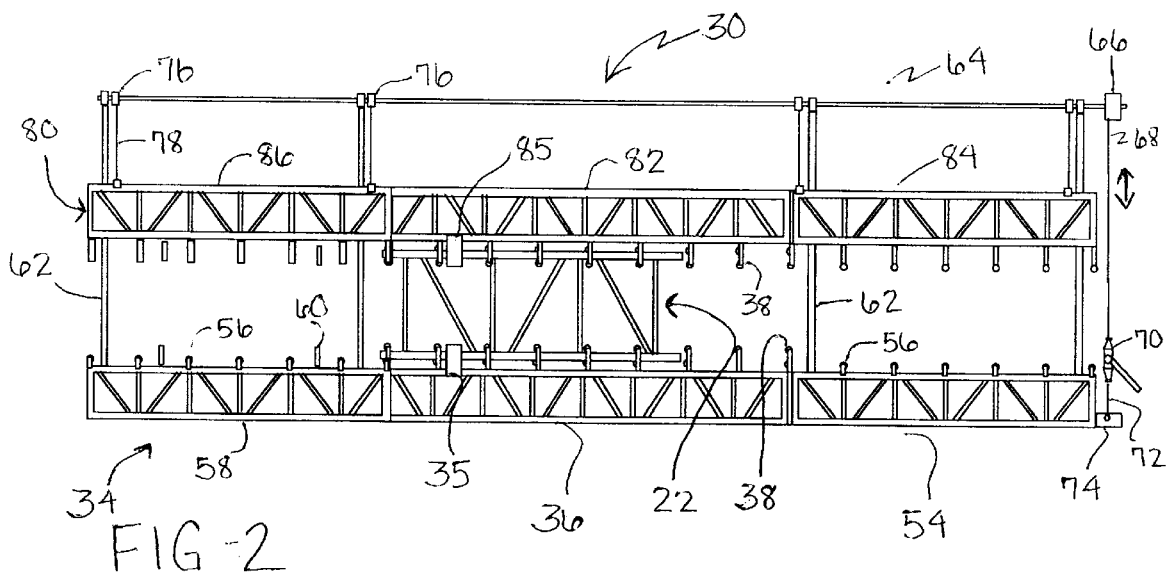
FIG. 2 is a side plan view of a frame support structure for a frame welding apparatus in accordance with a first embodiment of the present invention.
Figure 3A:
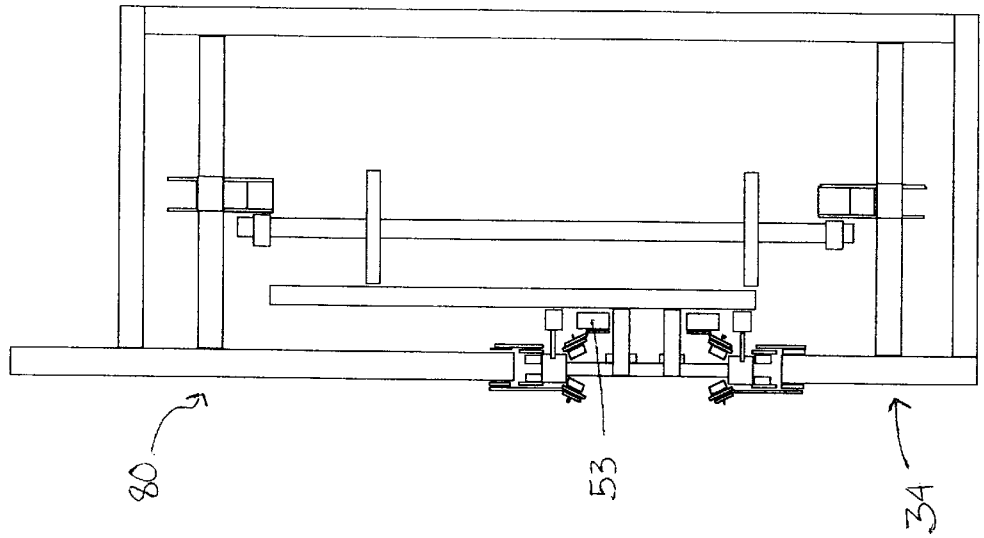
FIG. 3A is a cross-sectional view similar to that of FIG. 3, showing the apparatus adjusted downwardly to accommodate smaller frames.
Figure 3:
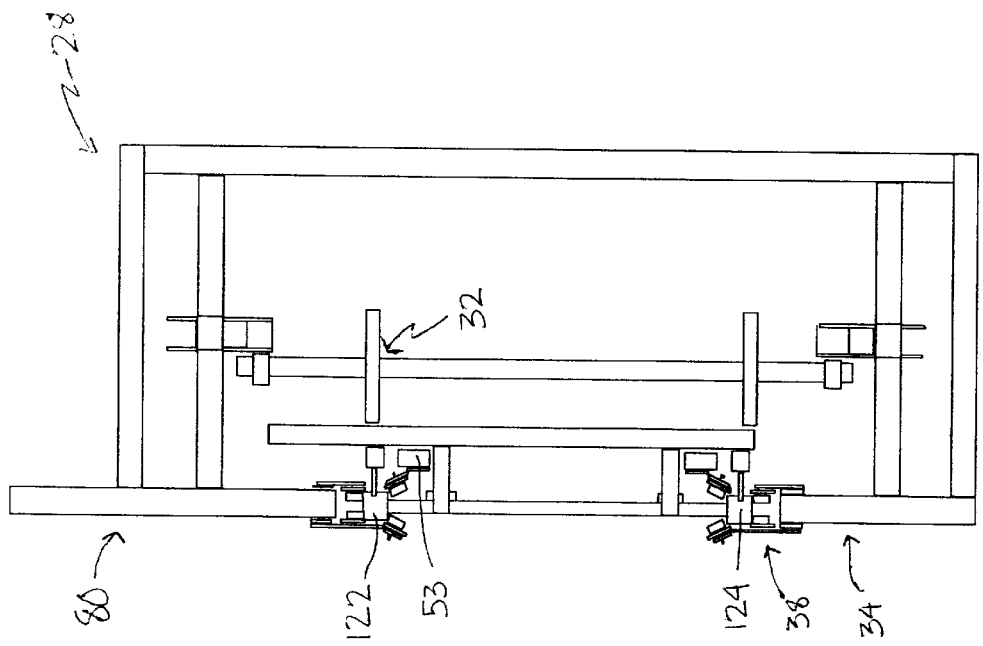
FIG. 3 is a partial cross-sectional view of an automated frame welding apparatus in accordance with the first embodiment of the present invention.

A first embodiment of an automated frame welding apparatus 28 according to the present invention is shown in cross-section in FIG. 3. The primary subassemblies making up the apparatus 28 are a frame support structure 30 (FIG. 2), which has a pair of automated welding stations 35, 85 mounted thereon, and a conveyor assembly 32 (FIG. 6). Each of these subassemblies will be discussed in further detail hereinbelow.

FRAME SUPPORT STRUCTURE

Referring now to FIGS. 2 and 3 of the drawings, a first embodiment of a frame support structure, for a frame welding apparatus 28 according to the present invention, is shown generally at 30 in FIG. 2. In general, the frame support structure 30 hereof includes a three part base assembly 34, a plurality of support posts 62 which are interconnected by a main cross shaft 64, an upper scaffold 80 which is adjustably mounted to the main cross shaft 64 by a series of cables 78.

The frame support structure 30 is shown with a latent frame 22 mounted thereon and in the process of undergoing fabrication. Throughout this specification, the term "latent frame" is used to mean an assemblage of the frame member components used to make a frame 10 in the proper orientation of those components with respect to one another, as discussed hereinabove in connection with FIG. 1, but prior to welding together of the components into a finished frame. The frames 10 which are produced by the method and apparatus of the present invention are substantially identical to those made by the manual assembly method, but to the best of Applicant's knowledge and understanding at the time of filing, the present method and apparatus for welding these frames 10, in an automated or partially automated manner, are novel and inventive.

The frame support structure 30 is generally fixed and stationary, and is provided to cooperate with a conveyor assembly 32 to support and guide travel of a latent frame 22 therethrough, and to support other parts of the frame welding apparatus 28 hereof, as will be described in further detail herein.

Figures 1, 1A:
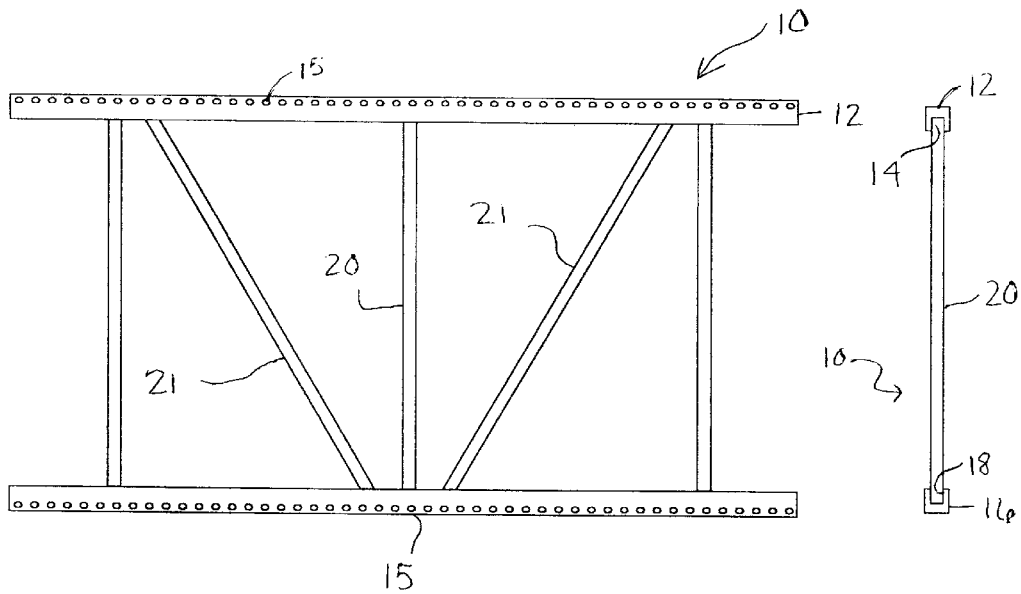
FIG. 1 is a side plan view of a prior art frame assembly.
FIG. 1A is a cross-sectional view of the frame assembly of FIG. 1.

The frame support structure 30 includes a base assembly 34 having a center section 36 which is similar to a long section such as, e.g., 192 inches, of a frame which is substantially similar to the type of frame 10 discussed in connection with FIG. 1. The center section 36 of the base assembly 34 has a lower welding station 35 affixed thereto, which will be discussed in further detail hereinbelow. The center section 36 of the base assembly 34 also has a plurality of triple roller assemblies 38 affixed thereto and extending upwardly thereon for guiding and supporting movement of a latent frame 22 therepast.

As seen more clearly in FIG. 4, each triple roller assembly 38 includes a first support plate 40 attached to and extending upwardly from an outer surface 42 of the center section 36. The first support plate 40 is substantially vertically oriented, and has an upper roller 44 and a lower roller 46 rotatably mounted thereto for supporting movement of a lower frame member 24 of the latent frame 22 therebetween. The triple roller assembly 38 also includes a second support plate 48 attached to and extending upwardly from an inner surface 50 of the center section 36. The second support plate 48 has a single roller 52 rotatably mounted thereto at the same height as the lower roller 46 of the first support plate 40, for cooperating therewith to support movement of the lower frame member 24 thereon. The single roller 52, on the second support plate 48, makes up the third and final roller of the triple roller assembly 38. Each triple roller assembly 38 cooperatively interacts with a complimentary roller 57, as shown in FIG. 4.

Each of the lower roller 46 and the opposite single roller 52 may, optionally, have magnets centrally disposed therein in order to help hold frame stock, such as a lower frame member, in proper position, and to allow the frame stock to move therepast. These magnets would not touch the stock, but the magnetic pull exercised thereby would help to hold the stock in position.

A stationary horizontally oriented crossbar 53 is provided affixed to the base assembly 34 in front of and external to the conveyor assembly 32. The horizontal crossbar 53 is vertically adjustable to accommodate different heights of frame stock, but is stationary in the sense that it does not move with the conveyor. The horizontal crossbar has a third roller support plate 55 attached thereto, and extending downwardly therefrom, adjacent each triple roller assembly. Each of the third roller support plates 55 carries a complimentary roller 57 rotatably attached thereto, disposed opposite the upper roller 44 of a triple roller assembly 38, to cooperate therewith in supporting and guiding the latent frame 22 therepast. The crossbar 53 may, optionally, have a protective wooden plank 59 attached to the rear surface thereof to guide movement of the conveyor assembly 32 therealong.

The base assembly 34 also includes a loading section 54 attached to the center section and extending to the right thereof as shown in FIG. 2. The loading section 54 is a medium length section such as, e.g., 144 inches of a frame which is substantially similar to the type of frame 10 discussed in connection with FIG. 1. The loading section 54 has a plurality of dual roller assemblies 56 extending upwardly therefrom to support movement of the lower frame member 24 of a latent frame 22 thereon. The structure of the dual roller assembly 56 is similar to that shown and discussed for the triple roller assembly 38, without the top roller 44 or its associated portion 41 of the first support plate 40 thereon.

The base assembly 34 also includes an unloading section 58 attached to the center section and extending to the left thereof as shown in FIG. 2. The unloading section 58 is another medium length section such as, e.g., 144 inches of a frame which is substantially similar to the type of frame 10 discussed in connection with FIG. 1. The unloading section 58 also has a plurality of dual roller assemblies 56 extending upwardly therefrom to support movement of a lower frame member 24 of a latent frame 22 thereon. Preferably, the unloading section 58 has one or more compressed air nozzles or cylinders 60 attached thereto to aid in unloading of finished frames therefrom. In place of the compressed air nozzles 60, the unloading section 58 of the support frame 30 may have a mechanical ejector.

The loading section 54 and the unloading section 58 each have a pair of support posts 62 provided attached thereto and extending upwardly therefrom. A main cross shaft 64 is provided at the tops of the support posts 62, the main cross shaft being rotatably attached to and interconnecting the support posts. The main cross shaft 64 has a drive wheel 66 fixedly attached to an end thereof above the loading section 54 of the base assembly 34, and a braided steel cable 68 is partially wrapped around the drive wheel 66. The steel cable 68 extends downwardly from the drive wheel 66 and is connected to a first winch 70 for adjusting the length of the cable 68. Another short length of braided steel cable 72 is attached to the first winch 70 at its lower end, and the cable 72 is anchored to an anchor bracket 74 which is affixed to the loading section 54 of the base assembly 34. The main cross shaft 64 also has a driven wheel 76 affixed thereto adjacent each support post 62, and each driven wheel 76 has its own braided steel cable 78 partially wrapped therearound and extending downwardly therefrom to support an upper scaffold 80 of the frame support structure 30.

As shown in FIGS. 3 and 3A, and as indicated by the vertical arrow in FIG. 2, a vertical adjustment of the scaffold 80 may be made with respect to the base assembly 34, to shorten or lengthen the distance therebetween in order to make frames having different dimensions. This is accomplished using the first winch 70 to shorten or lengthen the steel cable 68 to place the scaffold 80 at the desired height relative to the base assembly 34.

The scaffold 80 cooperates with the base assembly 34 to support and move a latent frame 22 therebetween. The scaffold 80, in a manner similar to the base assembly 34, includes a center section 82, a loading section 84, and an unloading section 86. The center section 82 of the scaffold 80 has a plurality of triple roller assemblies 38 attached thereto and extending downwardly therefrom to support and guide a latent frame 22 therepast. A triple roller assembly 38 is provided on the center section 82 of the scaffold 80 above, and corresponding to, each triple roller assembly 38 on the center section 36 of the base assembly 34 below. The center section 82 of the scaffold 80 also has an upper welding station 85 affixed thereto, as will be discussed in further detail hereinbelow.

The loading section 84 of the scaffold 80 is attached to and extends to the right of the center section 22 as shown in FIG. 2, and has a plurality of double roller assemblies 56 extending downwardly therefrom, corresponding to the number of double roller assemblies on the loading section 54 of the base assembly 34, to provide support under the frame stock until it reaches the center section 82.

The unloading section 86 of the scaffold 80 is attached to, and extends to the left of the center section in the drawing, and preferably includes one or more compressed air nozzles or cylinders 60 mounted thereon to assist in unloading completed frames therefrom. In place of the compressed air nozzles 60, the unloading section 86 of the scaffold 80 may have a mechanical ejector.

CONVEYOR ASSEMBLY

Referring now to FIGS. 4–8, a conveyor assembly 32 is shown and includes a movable conveyor 88. The conveyor assembly 32 is provided behind the frame support structure 30, for moving a latent frame 22 therethrough. The skeletal structure of the conveyor 88 is illustrated in FIG. 5, while the same conveyor is shown in FIGS. 6–7 carrying a drive chain assembly 116 which includes upper and lower drive chains 118, 120 and a plurality of vertically oriented drive bars 92 which are connected to, and are carried by, the drive chains 118, 120.

As best seen in FIG. 5, internally, the conveyor 88 includes first and second vertically oriented axles 94, 96 which are rotatably mounted in bearings 98 at the top and bottom ends thereof. Each of the axles 94, 96 carries an upper sprocket 100 and a lower sprocket 102 fixedly mounted thereon. A drive unit 104 is provided containing a drive motor and appropriate gears for rotatably driving the first axle 94 to move the conveyor 88.

An adjustable conveyor support framework 106 holds the axles 94, 96 vertically spaced apart, the conveyor support framework 106 including a fixed outer section 108 and an adjustably movable inner section 110 which is slidably mounted on the outer section 108, but which can be temporarily fixed in position with respect thereto. The first axle 94 is mounted to the left end of the outer section 108, as shown in the drawing, while the second axle 96 is mounted at the right end of the inner section 110.

Normally, this conveyor support framework 106 is not adjusted during a production run, but rather, it is only adjusted between runs, when needed, by the use of second and third winches 111, 113. The second winch 111 is connected to a cable 112 which is routed around a pulley 115. The third winch 113 can be found at the bottom of the conveyor support framework 106, and is used together with the second winch 111 to adjust the width of the conveyor support framework 106. A number of vertical braces 114 help to make up the conveyor support framework 106.

Referring now to FIGS. 6–7, the drive chain assembly 116 is mounted on to the sprockets 100, 102 to make up the moving part of the conveyor 88. As noted, the drive chain assembly 116 includes an upper chain 118 and a lower chain 120 which are interconnected by a series of vertically oriented drive bars 92. In the preferred embodiment of the present invention, each drive bar 92 has an upper pin 122 and a lower pin 124 attached thereto, each of the pins 122, 124 extending horizontally out of the side thereof for engaging in holes 126, 128 formed through upper and lower frame members 130, 132, respectively, of a latent frame assembly 22. When the pins 122, 124 thus engage the frame members 130, 132, the drive bar 92, as part of the conveyor 88, is able to engagingly drive the latent frame assembly 22 through the frame support structure 30.

Those skilled in the relevant art will realize that other means for driving a latent frame through the frame support structure, which is different from the drive pins 122, 124 could be attached to the drive bars to do the same job. For example, drive arms (not shown) could be substituted in place of the drive pins 122, 124 and could be used to push the upper and lower frame members from behind, rather than engaging in holes therein.

Referring now to FIG. 8, it may be seen that in the preferred embodiment of the present invention, a number of the drive bars 92 have horizontally oriented magnet arms 134 adjustably attached thereto, and each magnet arm 134 has a magnet 136 attached thereto. The magnets 136 may be permanent magnets, or may be electromagnets. A number of magnet arms 134, working together with the drive bars 92 on which they are mounted, make up a frame jig 138 for carrying the components of a latent frame assembly 22 through the apparatus 28, while keeping those components correctly oriented in spaced relation with respect to one another, exactly as they will be oriented in the finished frame. One or more frame jigs 138 may be mounted on the conveyor 88, and each jig 138 cycles repeatedly around the conveyor 88 and can be re-used many times. It should be noted that alternate means for carrying the latent frame components may be used herein, and any such mode for synchronizing movement of the upper and lower frame members is within the scope hereof.

METHOD OF USE

Referring now to FIG. 8, in putting a latent frame assembly 22 together at the loading end of the apparatus 28, an upper frame member 130 and a lower frame member 132 are manually or robotically lined up so that a drive arm 92 of the conveyor engages corresponding and aligned holes 126, 128 therein, at the same time with its upper and lower pins 122, 124 (FIG. 3), and begins to move the upper and lower frame members through the apparatus 28. Then, a suitable number of vertical cross members 140 and slanted cross members 142 are manually or robotically placed on the magnet arms, in the final and correct alignment thereof, between the upper and lower frame members 130, 132 to complete a latent frame assembly 22. From that point on, the latent frame assembly 22 moves through the apparatus as a cohesive unit.

Alternatively, all of the frame members 130, 132, 140, 142 may be placed on the frame jig 138 as a preliminary step, and then the pins 122, 124 of the drive arm 92 may engage in the holes 126, 128 and begin moving the latent frame 22 through the apparatus 28.

Referring now to FIG. 9, when the latent frame assembly 22 reaches the upper and lower welding stations 85, 35, which are located at the same horizontal point of travel on the frame support structure 30, the leading vertical cross member 140 contacts actuator arms 144, 146 on respective upper and lower trigger switches 148, 150 and moves the actuator arms aside to activate upper and lower welding tips 152, 154. Mig welders are preferred in the practice of the present invention. The welding tip 152, 154 are switched on to weld the vertical cross member to the upper and lower frame members 130, 132. After the vertical cross member moves beyond the trigger switches 148,150, the actuator arms 144, 146 return to their resting positions and the welding tips 152, 154 are switched off thereby. In a similar fashion, when a slanted cross member 142 reaches the welding stations, it sequentially trips the actuator arms 144, 146 of the respective trigger switches 148, 150, when the upper and lower portions of the slanted cross member reach the trigger switches. Since the upper and lower portions of the slanted cross member 142 do not reach the welding stations 35, 85 at the same time, in this case, the upper and lower welding tips operate independently of one another as they are switched on by the trigger switches.

Alternatively, duration of the operation of the welding tips 152, 154 may be preset, using a timer, and the trigger switches 148, 150 may be used only to switch the welding tips 152, 154 on. In such a design, the welding tips 152, 154 would continue to weld until the timer shut them down. Suitable trigger switches include laser switches, photoelectric cells, magnetic switches and the like. It is to be understood that FIG. 9 illustrates only one side of the welding station and that there is a mirrored welding station on the other side of the frame. The opposed welding station is, preferably, offset along the horizontal, slightly, to accommodate the positioning of the trigger switch, since the flash of the weld may erroneously activate the trigger switch if welding occurred simultaneously.

ALTERNATIVE SECOND EMBODIMENT

Referring now to FIGS. 10–14 of the drawings, a second embodiment of a frame support structure, for a frame welding apparatus 228 according to the present invention, is shown generally at 230. The frame support structure 230 is shown with a latent frame 22 mounted thereon and in the process of undergoing fabrication.

The frame support structure 230 of the second embodiment hereof is generally fixed and stationary, and is provided to cooperate with a conveyor assembly 232 to support and guide travel of a latent frame 22 therethrough, and to support other parts of the frame welding apparatus 228 hereof, as will be described in further detail herein. The frame support structure 230 includes a base assembly 234 having a center section 236 which is similar to a long section such as, e.g., 192 inches, of a frame which is substantially similar to the type of frame 10 discussed in connection with FIG. 1. The center section 236 of the base 234 has a lower welding station 235 affixed thereto, which will be discussed in further detail hereinbelow.

The center section 236 of the base 234 has two types of roller assemblies 238, 248 affixed thereto and extending upwardly thereon for guiding and supporting movement of a latent frame 22 therepast. Single roller assemblies 238, for supporting a frame member 224 from below, alternate with, and are horizontally spaced apart from, dual roller assemblies 248 for supporting the frame member 224 from above.

Figure 12:
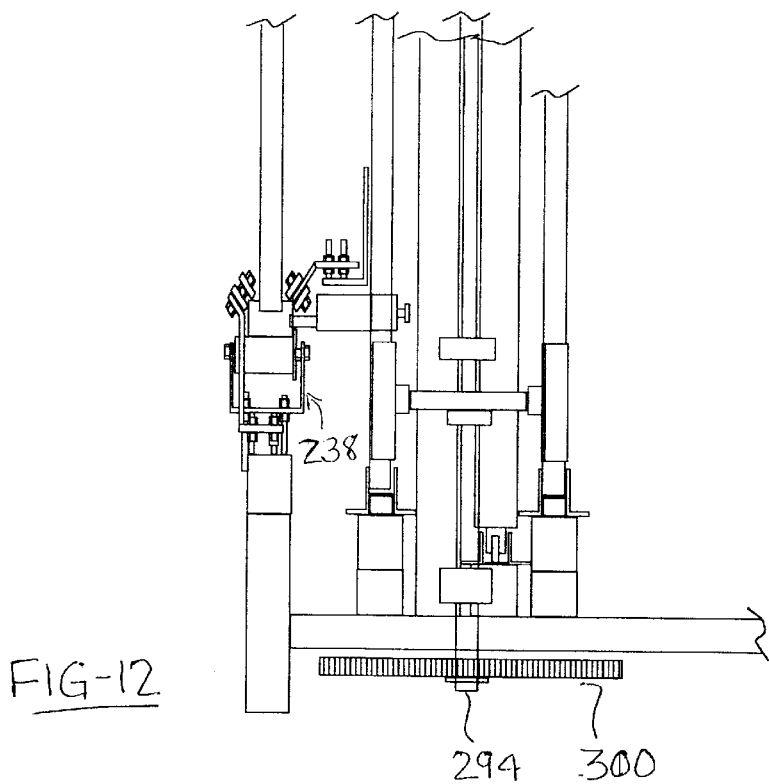
FIG. 12 is a detail view of a lower section of FIG. 11.

As seen more clearly in FIGS. 12 and 13, each single roller assembly 238 includes a U-shaped roller support bracket 240 attached to and extending upwardly from an upper bar 242 of the base 230. The U-shaped support bracket 240 has a central roller 246 rotatably mounted thereto between side plates 241 thereof, for supporting movement of the lower frame member 224 of the latent frame 22 thereon.

By contrast, each dual roller assembly 248 includes an L-shaped roller support bracket 249 attached to and extending upwardly from the upper bar 242 of the base 230. The L-shaped bracket 249 has a pair of rollers 250, 252 rotatably mounted on the top end thereof, and these rollers are oriented at a 45 degree angle to the vertical, as shown. A spacer 251 is placed between the two rollers 250, 252, creating a space therebetween to receive the top outer corner of the lower frame member 224 therein, as shown, in order to help guide movement of the latent frame 22 through the apparatus 228.

A stationary horizontally oriented crossbar 253 is provided affixed to the base 234 in front of and external to the conveyor assembly 232. The crossbar 253 is vertically adjustable to accommodate different heights of frame stock. The crossbar 253 has an inverted V-shaped roller support bracket 255 attached thereto, and extending downwardly therefrom, as shown, adjacent and opposite the top of each L-shaped bracket 240. Each of the V-shaped brackets 255 has a dual roller 257 rotatably attached thereto, disposed opposite the rollers 250, 252 on the L-shaped bracket 240, to cooperate therewith in supporting and guiding the latent frame 22 therepast.

The central roller 246 may, optionally, have magnets centrally disposed therein in order to help hold frame stock, such as a lower frame member, in proper position, and to allow the frame stock to move therepast. These magnets would not touch the stock, but the magnetic pull exercised thereby would help to hold the stock in position. If desired, magnets could also be incorporated into other rollers 250, 252, 257 which cooperate with the central roller 246.

Figure 10:
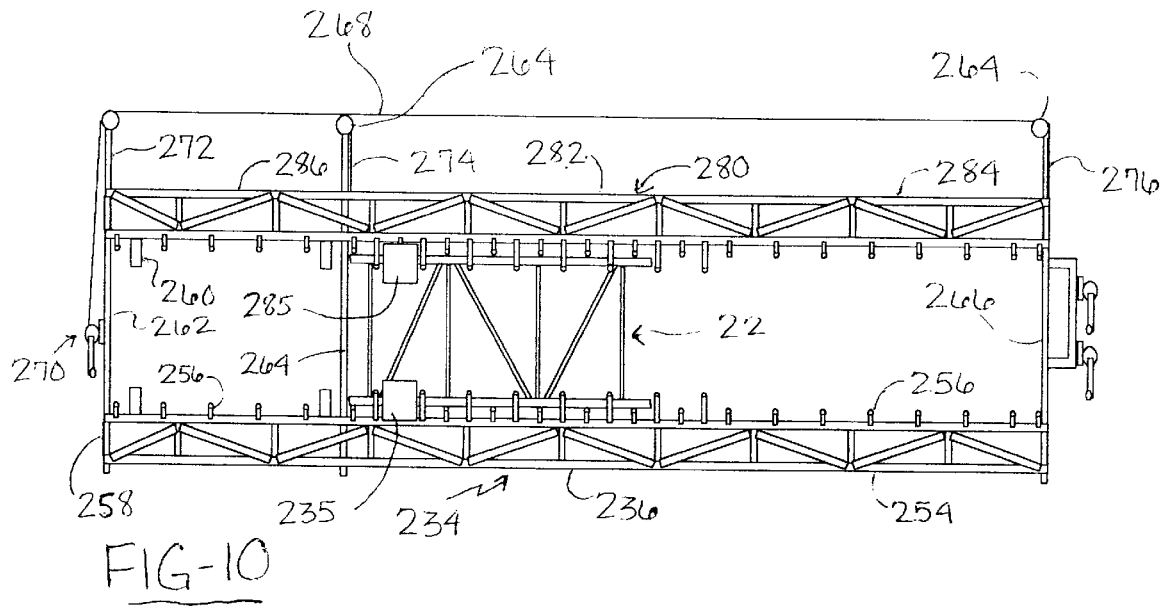
FIG. 10 is a side plan view of a frame support structure for a frame welding apparatus in accordance with a second embodiment of the present invention.

The base 234 also includes a loading section 254 attached to the center section 236 and extending to the right thereof as shown in FIG. 10. The loading section 254 is a medium length section such as, e.g., 144 inches of a frame which is substantially similar to the type of frame 10 discussed in connection with FIG. 1. The loading section 254 has a plurality of single roller assemblies 238 attached thereto and extending upwardly therefrom, to support movement of the lower frame member 224 of a latent frame 22 thereon.

The base 234 also includes an unloading section 258 attached to the center section 236 and extending to the left thereof as shown in FIG. 10. The unloading section 258 is another medium length section such as, e.g., 144 inches of a frame which is substantially similar to the type of frame 10 discussed in connection with FIG. 1. The unloading section 258 also has a plurality of single roller assemblies 238 extending upwardly therefrom to support movement of a lower frame member 224 of a latent frame 22 thereon. Preferably, the unloading section 258 has one or more compressed air nozzles 260 attached thereto to aid in unloading of finished frames therefrom. In place of the compressed air nozzles 260, the unloading section 258 of the support frame 230 may have a mechanical ejector.

The base 234, in this embodiment, has three support posts 262, 264, 266 provided attached thereto and extending upwardly therefrom. A pulley 264 is provided at the top of each support post 262, 264,266. A first winch 270 is provided attached to a support post 262 at the unloading section 258, and a braided steel cable 268 is partially wrapped around the first winch 270 and extends to each of the pulleys 264 in conventional fashion. Other lengths of braided steel cable 272, 274, 276 are attached to the respective pulleys 264 and extend downwardly therefrom to support an upper scaffold 280 of the frame support structure 230.

A vertical adjustment of the scaffold 280 may be made with respect to the base 234 to shorten or lengthen the distance therebetween in order to make frames having different dimensions. This is accomplished using the first winch 270 to shorten or lengthen the steel cable 268 to place the scaffold 280 at the desired height relative to the base 234.

The scaffold 280 cooperates with the base 234 to support and move a latent frame 22 therebetween. The scaffold 280, in a manner similar to the base 234, includes a center section 282, a loading section 284, and an unloading section 286. FIG. 14 illustrates that the portion of the scaffold above the center section 236 of the base 234 is substantially a mirror image of the base 234 below. The center section 282 of the scaffold 280 has a plurality of alternating single roller assemblies 238 and dual roller assemblies 248 attached thereto and extending downwardly therefrom to support and guide a latent frame 22 therepast. A dual roller assembly 248 is provided on the center section 282 of the scaffold 280 above, and corresponding to, each dual roller assembly 248 on the center section 236 of the base 234 below. The center section 282 of the scaffold 280 also has an upper welding station 285 affixed thereto.

The loading section 284 of the scaffold 280 is attached to and extends to the right of the center section 282 as shown in FIG. 2, and has a plurality of single roller assemblies 238 extending upwardly therefrom corresponding to the number of single roller assemblies on the loading section 254 of the base 234.

The unloading section 286 of the scaffold 280 is attached to and extends to the left of the center section in the drawing, and preferably includes one or more compressed air nozzles 260 mounted thereon to assist in unloading completed frames therefrom. In place of the compressed air nozzles 260, the unloading section 286 of the scaffold 280 may have a mechanical ejector.

Figure 15:
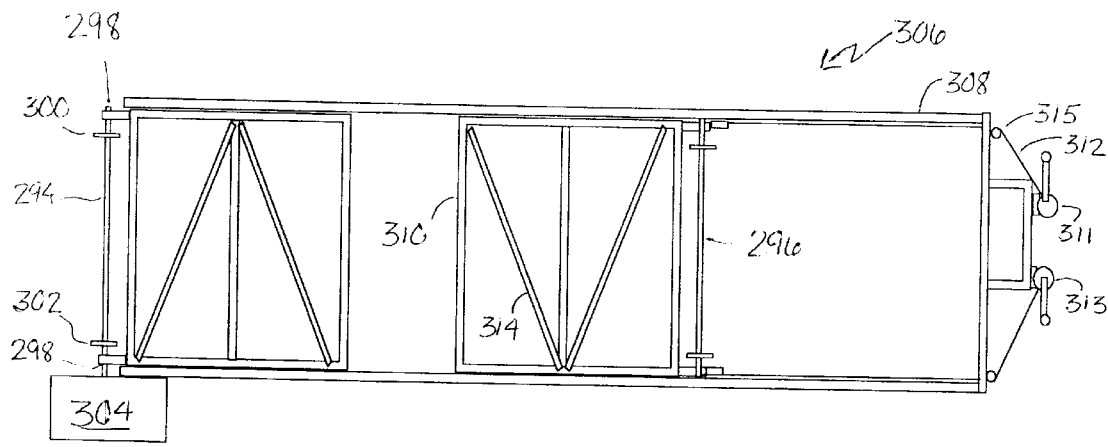
FIG. 15 is a side plan view of a supportive framework and drive mechanism for a conveyor for moving a latent frame assembly through the support structure of FIG. 10, with a drive chain assembly removed for purposes of illustration.
Figure 16:
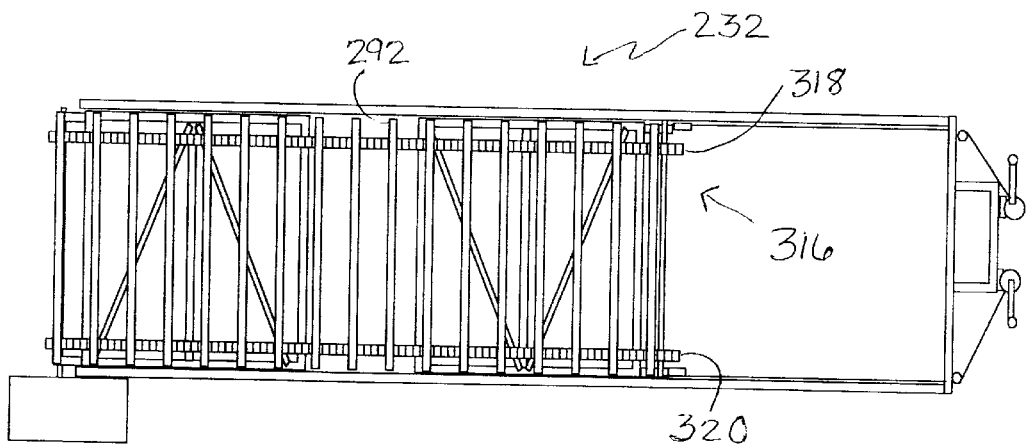
FIG. 16 is a side plan view of the conveyor of FIG. 15, showing the drive chain assembly in place.
Figure 17:
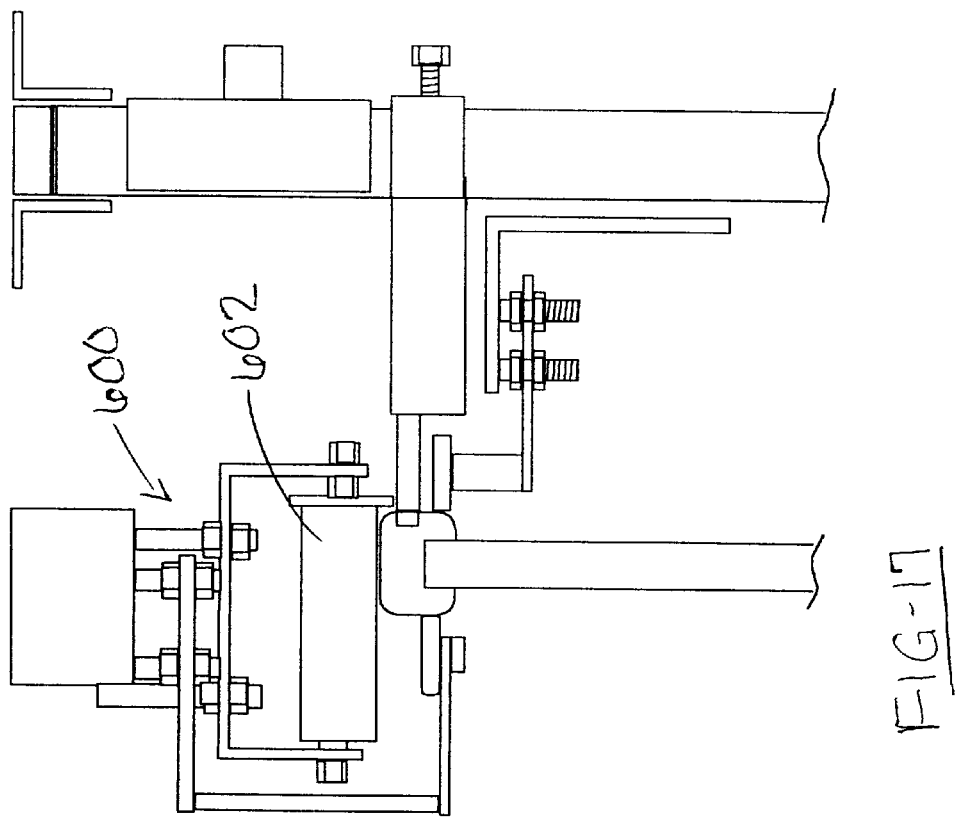
FIG. 17 is a detail view of an upper section of an alternate upper roller section.

Referring now to FIGS. 15–17, a movable conveyor assembly 232 is provided behind the frame support structure 230 for moving a latent frame 22 therethrough. The skeletal structure of the conveyor assembly 232 is illustrated in FIG. 15, while the same conveyor is shown in FIGS. 16–17 carrying a drive chain assembly 316 which includes upper and lower drive chains 318, 320 and a plurality of vertically oriented drive bars 292 which are connected to, and are carried by, the drive chains 318, 320.

As best seen in FIG. 15, internally, the conveyor assembly 232 includes first and second vertically oriented axles 294, 296 which are rotatably mounted in bearings 298 at the top and bottom ends thereof. Each of the axles 294, 296 carries an upper sprocket 300 and a lower sprocket 302 fixedly mounted thereon. A drive unit 304 is provided containing a conventional drive motor and appropriate gears (not shown) for rotatably driving the first axle 294 to move the conveyor drive chains 318, 320.

An adjustable conveyor support framework 306 holds the axles 294, 296 vertically spaced apart, the conveyor support framework 306 including a fixed outer section 308 and an adjustably movable inner section 310 which is slidably mounted on the outer section 308, but which can be temporarily fixed in position with respect thereto. The first axle 294 is mounted to the left end of the outer section 308, as shown in the drawing, while the second axle 296 is mounted at the right end of the inner section. Normally, this conveyor support framework 306 is not adjusted during a production run, but rather, it is only adjusted between runs, when needed, by the use of second and third winches 311, 313. The second winch 311 is connected to a cable 312 which is routed around a pulley 315. Another identical winch 313 can be found at the bottom of the conveyor support framework 306, and is used together with the second winch 311 to adjust the width of the conveyor support framework 306. A number of vertical braces 314 help to make up the conveyor support framework 306.

Referring now to FIGS. 15–16, the drive chain assembly 316 is mounted on to the sprockets 300, 302 to make up the moving part of the conveyor assembly 232. As noted, the drive chain assembly 316 includes an upper chain 318 and a lower chain 320 which are interconnected by a series of vertically oriented drive bars 292. In the preferred embodiment of the present invention, there is provided means for engaging the latent frame assembly 22. Herein, it is shown that each drive bar 292 has an upper pin 322 and a lower pin 324 attached thereto, each of the pins 322, 324 extending horizontally out of the side thereof for engaging in holes 126, 128 formed through upper and lower frame members 130, 132, respectively, of a latent frame assembly 22. When the pins 322, 324 thus engage the frame members 130, 132, the drive bar 292, as part of the conveyor assembly 232, is able to engagingly drive the latent frame assembly 22 through the frame support structure 230.

It should be understood that an upper and lower pin need not be associated with each drive bar. Rather, the number of drive bars having pins associated therewith is dictated by the size of the latent frame assembly.

In the apparatus 228 according to the second embodiment of the present invention, the upper and lower welding stations 235, 285, work in the same way as that described hereinabove in connection with the welding stations 35, 85 of the first embodiment.

Figure 18:
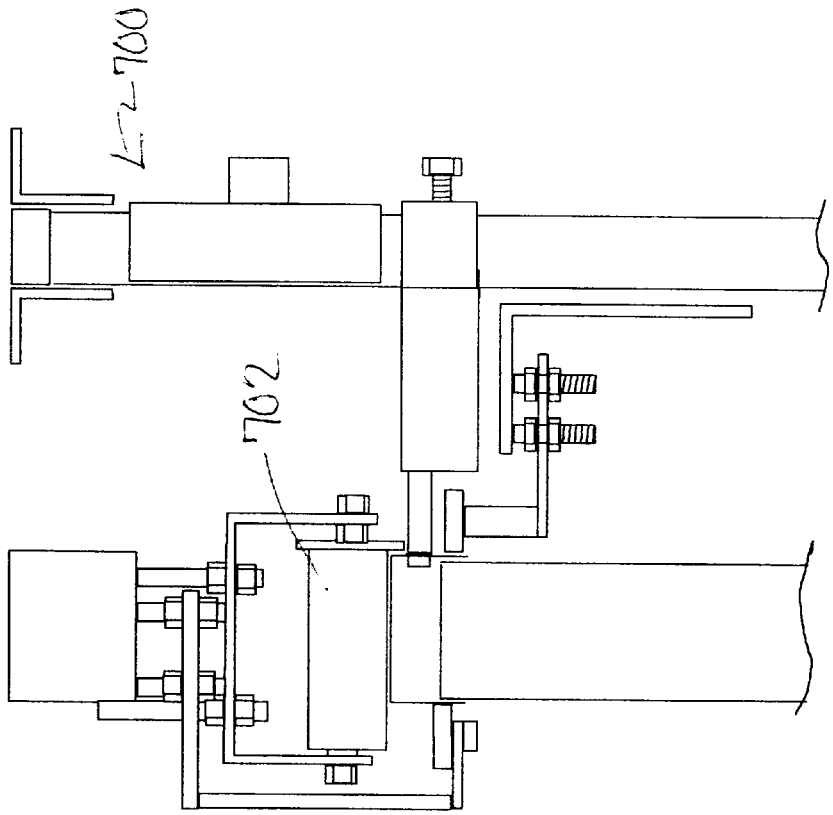
FIG. 18 is a detail view of a further upper roller section.

FIGS. 17 and 18 show different bearing assemblies 600 and 700, respectively, for rollers 602 and 702, respectively. These bearing assemblies are particularly adapted for use in the present invention when magnets are used to suspend the frame stock. Such magnets are used both at the upper and lower rollers as described hereinabove.

Although the present invention has been described herein with respect to a preferred embodiment thereof, the foregoing description is intended to be illustrative, and not restrictive. Those skilled in the art will realize that many modifications of the preferred embodiment could be made and would be operable. All such modifications which are within the scope of the claims are intended to be within the scope and spirit of the present invention.

Having, thus, described the invention, what is claimed is:

1. An apparatus for welding steel frames, comprising:

a support structure for moveably supporting a plurality of frame components as they are guided therethrough by a conveyor comprising, a base assembly and an upper scaffold which is vertically adjustable with respect to the base assembly, to allow the apparatus to fabricate frames of different heights;

a conveyor which is moveably attached to the support structure, for holding a plurality of framed components in spaced relation to one another and for guiding the frame components through the support structure in a frame welding operation;

means for moving the conveyor with respect to the support structure; and at least one welding station attached to the support structure, the welding station comprising, a welding tip for welding frame components together, and a trigger switch for switching the welding tip on.

2. The apparatus of claim 1, wherein the support structure further comprises at least two vertically oriented support posts, a horizontally oriented main cross shaft which is attached to the support posts, and a pair of cables which suspend the scaffold section from the main cross shaft.

3. An apparatus for welding steel frames, comprising:

a support structure for moveably supporting a plurality of frame components as they are guided therethrough by a conveyor comprising, a base assembly and an upper scaffold which is vertically adjustable with respect to the base assembly, to allow the apparatus to fabricate frames of different heights;

a conveyor which is moveably attached to the support structure comprising, a first axle, first and second sprockets mounted on opposite ends of the first axle, a second axle, third and fourth sprockets mounted on opposite ends of the second axle, a first chain mounted to the first and third sprockets for movement thereby, a second chain mounted to the second and fourth sprockets for movement thereby, and a plurality of drive bars attached to the first and second chains for movement therewith, for holding a plurality of framed components in spaced relation to one another and for guiding the frame components through the support structure in a frame welding operation;

at least one welding station attached to the support structure, the welding station comprising a welding tip for welding frame components together, and a trigger switch for switching on the welding tip.

4. The apparatus of claim 3 wherein at least one of the drive bars has a pin attached thereto and extending outwardly therefrom, for engaging with a frame member.

5. The apparatus of claim 3, further comprising a plurality of magnet arms attached to selected drive bars for magnet attachment of frame members thereto.

6. The apparatus of claim 1, wherein the support frame has a plurality of rollers rotatably mounted thereto for supporting movement of a frame member thereon.

* * * * *